United States Patent [19]

Maru et al.

[11] Patent Number: 4,490,442
[45] Date of Patent: Dec. 25, 1984

[54] FUEL CELL SYSTEM AND METHOD

[75] Inventors: Hansraj C. Maru, Brookfield Center; Mohammad Farooque, Huntington, both of Conn.

[73] Assignee: Energy Research Corporation, Danbury, Conn.

[21] Appl. No.: 507,071

[22] Filed: Jun. 23, 1983

[51] Int. Cl.³ .............................................. H01M 8/04
[52] U.S. Cl. ........................................ 429/13; 429/26
[58] Field of Search .................................... 429/13, 26

[56] References Cited

U.S. PATENT DOCUMENTS

| 3,516,867 | 6/1970 | Dankese | 429/26 |
| 4,169,917 | 10/1979 | Baker et al. | 429/26 |
| 4,182,795 | 1/1980 | Baker et al. | 429/26 |
| 4,192,906 | 3/1980 | Maru | 429/26 |
| 4,276,355 | 6/1981 | Kothmann et al. | 429/26 |
| 4,342,816 | 8/1982 | Kothmann et al. | 429/13 |
| 4,407,904 | 10/1983 | Uozumi et al. | 429/26 |

FOREIGN PATENT DOCUMENTS 1553361 1/1969 France .

Primary Examiner—Donald L. Walton

[57] ABSTRACT

A fuel cell system comprising a fuel cell including first and second electrolyte-communicative passage means, a third electrolyte-isolated passage means in thermal communication with a heat generating surface of the cell, independent first, second and third input manifolds for the first, second and third passage means, the first input manifold being adapted to be connected to a first supply for a first process gas and one of the second and third input manifold means being adapted to be connected to a second supply for a second process gas, and means for conveying a portion of the gas passing out of the passage means fed by the one input manifold means to the other of the second and third input manifold means.

12 Claims, 2 Drawing Figures

FUEL CELL SYSTEM AND METHOD

BACKGROUND OF THE INVENTION

This invention relates to fuel cell systems and, in particular, to fuel cell systems in which cooling of the fuel cells with process gas is employed.

In U.S. Pat. No. 4,192,906, a fuel cell system is disclosed wherein the fuel cell includes first and second electrolyte communicative passages for carrying first and second (i.e., oxidant and fuel) process gases to first and second electrodes of the cell. The cell also includes a third electrolyte-isolated passage in thermal communication with a heat generating surface of the cell for carrying a cooling gas through the cell. A first process gas is supplied to the first electrolyte-communicative passage and is split between that passage and the electrolyte-isolated passage by feeding such process gas from its supply to an input manifold common to both sets of passages. In this way, the first process gas also serves as the cooling gas. This patent also teaches that the output gas from the electrolyte-isolated passage either alone or after mixing with the output gas of the first electrolyte-communicative passage, can be fed to the common input manifold for recirculation.

While the fuel cell arrangement of the '906 patent results in successful cooling, it may cause dilution of the first process gas passing through the first electrolyte-communicative passage. This, in turn, reduces the performance of the fuel cell.

U.S. Pat. Nos. 4,276,355 and 4,342,816 disclose a further fuel cell system wherein first and second electrolyte-communicative passages carry process gas and a third electrolyte-isolated passage carries cooling gas through the cell and independent manifolds feed the respective passages. While this type of arrangement can be used to avoid dilution effects, three independent gas streams (i.e., first and second process gas streams and a cooling gas stream) are contemplated.

It is therefore an object of the present invention to provide a fuel cell sytem which offers certain improvements over the above-described arrangements.

It is a further object of the present invention to provide a fuel cell system in which cooling can be achieved with independent manifolds, but without the necessity for three independent gas streams.

It is a further object of the present invention to provide a fuel cell system of the last mentioned type in which cooling can be further realized while inhibiting dilution effects.

SUMMARY OF THE INVENTION

In accordance with the principles of the present invention, the above and other objectives are realized in a fuel cell system provided with first and second electrolyte-communicative passages and a third electrolyte-isolated passage, the latter passage being in thermal communication with a heat generating surface of the cell. First, second and third independent manifolds communicate with and provide process gas to the first, second and third passages. The first manifold is adapted to receive process gas from a first supply, while one of the second and third manifolds is adapted to receive process gas from a second supply. Means are further provided for conveying a portion of the process gas passing out of the passage fed by the one manifold to the other of the second and third manifolds.

With this type of fuel cell system, only two gas streams are required, one for the second and third passages and another for the first passage. Moreover, when the second supply serves the third input manifold, the second input manifold and thus the second electrolyte-communicative passage receives undiluted process gas. Hence, a more efficient and less complicated system results.

DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
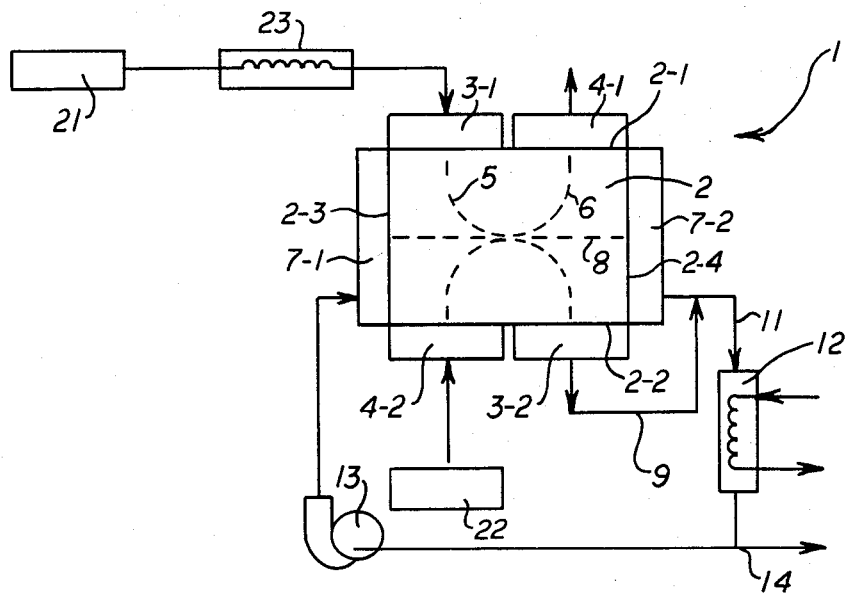
FIG. 1 illustrates a first embodiment of a fuel cell system in accordance with the principles of the present invention.

In FIG. 1, the fuel cell system 1 comprises a fuel cell 2 having four sides or faces 2-1, 2-2, 2-3 and 2-4. The faces 2-1 and 2-2 communicate with a first set of manifolds 3-1 and 3-2. These faces also communicate with a second set of manifolds 4-1 and 4-2 which are independent of the manifolds 3-1 and 3-2.

The manifolds 3-1 and 3-2 serve as input and output manifolds, respectively, for a first process gas derived from a first supply 21 and preheated by a heat exchanger 23.

This first process gas is carried through the cell 2 via electrolyte-communicative passages 5 having a Z-path configuration. The manifolds 4-1 and 4-2, in turn, serve as output and input manifolds for a second process gas derived from a second supply 22. This gas is carried through the cell 2 via electrolyte communicative passages 6 also having a Z-path configuration. Within the cell 2 the first and second gases communicate with an electrolyte via respective electrodes (not visible) and undergo electrochemical reaction to produce the cell electrical output. This electrochemical reaction also produces heat which requires the cell to be cooled.

In order to cool the cell, a third set of input and output manifolds 7-1 and 7-2 independent of the manifolds 3-1 and 3-2 and 4-1 and 4-2 are provided. These manifolds communicate with faces 2-3 and 2-4 of the cell 2, respectively, and serve as input and output manifolds for cooling gas passing through a third set of electrolyte-isolated passages 8. The passages 8, in turn, are in thermal communication with a heat generating surface (not visible) of the cell.

In accordance with this embodiment of the invention, the cooling gas carried by the passages 8 is derived from the output gas of one of the process gas passages 5 and 6. In particular, as shown, a portion of the exhaust or output gas from the manifold 3-2 is coupled via lines 9 and 11 to the input mnifold 7-1 of the passages 8. A heat exchanger 12 in the line 11 cools the gas prior to entry into the manifold 7-1 and a blower 13 also in the line 11 aids in circulating the gas. The output from the manifold 7-2 is also recirculated via the line 11 back to the input manifold 7-1. Excess gas is bled from the line 11 via bleed line 14.

With the fuel system in FIG. 1, only two gas streams are required even though independent manifolds are used for the first and second reactant gases (i.e., those in passages 5 and 6) and the cooling gas (i.e., that in passages 8). Thus, independent supplies for three streams are avoided and an overall simpler system, where independent cooling and process gas manifolds are used, is realized.

It should be noted that first and second supplies 21 and 22 can be oxidant and fuel supplies, respectively. In such case, the cooling gas will be oxidant gas. Alternatively, the supply 21 can be a fuel supply and the supply 22 an oxidant supply. In this latter case, the cooling gas will be fuel gas.

Figure 2:
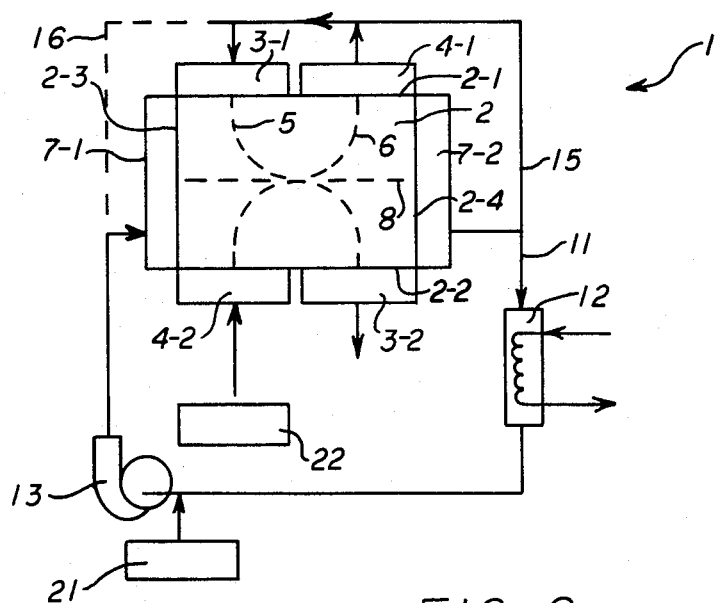
FIG. 2 shows a second embodiment of a fuel cell system in accordance with the principles of the present invention.

FIG. 2 shows a second embodiment of the present invention. In this embodiment, like elements of the fuel cell system 1 have been numbered similarly as in the FIG. 1. embodiment. As can be seen in this case, the first process gas supply 21 feeds process gas directly to the line 11, while a portion of the output from manifold 7-2 entering the line 11 is coupled by a line 15 in this preferred case directly (i.e., without substantial temperature change) to the input manifold 3-1. Thus, the process gas is first heated by passage through the cooling passages 8 and the heated process gas is then fed directly into the process gas channels 5 via the manifold 3-1. As before, the supply 21 can be either an oxidant supply or a fuel supply, in which case the supply 22 will be either a fuel supply or an oxidant supply, respectively.

With this embodiment of the invention again only two gas streams are required when using three independent sets of manifolds. Also, the process gas is being fed to the process gas channels already heated and in an undiluted state. Moreover, cooling is effected without electrolyte vapor being introduced into the cooling loop. An overall simpler and more efficient system results.

In a modification of the embodiment of FIG. 2, a portion of the output of manifold 7-2 is fed to the manifold 3-1 from a point further down line 11 as, for example, after the blower 13 as shown by dotted line 16. While this gas is still undiluted, as in the case of the use of line 15, it is preheated to a lower temperature than the gas available from line 15 due to the cooling effect of heat exchanger 12. In this case, the process gas in passages 5 will also provide some cooling, thus the cooling load of gases in line 8 is reduced.

In all cases, it is understood that the above-described arrangements are merely illustrative of the many possible specific embodiments which represent applications of the present invention. Numerous and varied other arrangements can be readily devised without departing from the spirit and scope of the invention.

What is claimed is:

1. A fuel cell system comprising:
a fuel cell including:
first passage means in electrolyte-communication for conducting a first process gas through said cell;
second passage means in electrolyte-communication for conducting a process gas through said cell;
third passage means in electrolyte-isolation for conducting a process gas through said cell, said third passage means being in thermal communication with a heat generating surface of said cell;
first, second and third input manifold means independent of each other and communicating with said first, second and third passages means, respectively, said first manifold means being adapted to be connected to a first supply for said first process gas and said third manifold means being adapted to be connected to a second supply for a second process gas;
first means for conveying a first portion of the gas passing out of the third passage means to said second input manifold means without substantial change in temperature;
and second means for conveying a second portion of said gas passing out of the third passage means to said third input manifold means, said second means for conveying including means for effecting a temperature change in said second portion of said gas.

2. A fuel cell system in accordance with claim 1 wherein:
said second process gas is oxidant process gas.

3. A fuel cell system in accordance with claim 1 wherein:
said second process gas is fuel process gas.

4. A fuel cell system in accordance with claim 1 wherein:
said system further comprises first, second and third output manifold means independent of each other and communicating with said first, second and third passage means, respectively;
and said first and second conveying means are connected to the third output manifold means.

5. A fuel cell system in accordance with claim 4 wherein:
said first and second passage means each follow a Z-type path.

6. A fuel cell system in accordance with claim 4 wherein:
said fuel cell further comprises flat outer faces;
and each of said input and output manifold means abuts a flat face of said fuel cell.

7. A fuel cell system in accordance with claim 6 wherein:
said fuel cell comprises first and second opposing flat faces and third and fourth opposing flat faces;
said third input and third output manifold means abut said first and second flat faces, respectively;
said first input and second output manifold means abut said third flat face;
and said second input and first output manifold means abut said fourth flat face and oppose said first input and second output manifold means, respectively.

8. A fuel cell system in accordance with claim 1 wherein:
at least one of said first and second passage means follows a Z-type path.

9. A fuel cell system in accordance with claim 8 wherein:
said first and second passage means each follow a Z-type path.

10. A method of operating a fuel cell system comprising a fuel cell including: first passage means in electrolyte-communication for conducting a first process gas through said cell; second passage means in electrolyte-communication for conducting a process gas through said cell; third passage means in electrolyte-isolation for conducting a process gas through said cell, said third passage means being in thermal communication with a heat generating surface of said cell, and first, second and third input manifold means independent of each other and communicating with said first, second and third passages means, respectively, said method comprising:
conveying said first process gas from a first supply to said first manifold means;

conveying a second process gas from a second supply to said third manifold means;

conveying a first portion of the gas passing out of the third passage means to said second input manifold means without substantial change in temperature; and conveying a second portion of the gas passing out of the third passage means to said third input manifold means, the temperature of said second portion of gas being changed.

11. A method in accordance with claim 10 wherein: said second process gas is oxidant process gas.

12. A method in accordance with claim 10 wherein: said second process gas is fuel process gas.

* * * * *